T. CARROLL.
SALES RECORDING AND TOTALIZING MECHANISM.
APPLICATION FILED MAY 26, 1911.
1,174,680.
Patented Mar. 7, 1916.
3 SHEETS—SHEET 3.
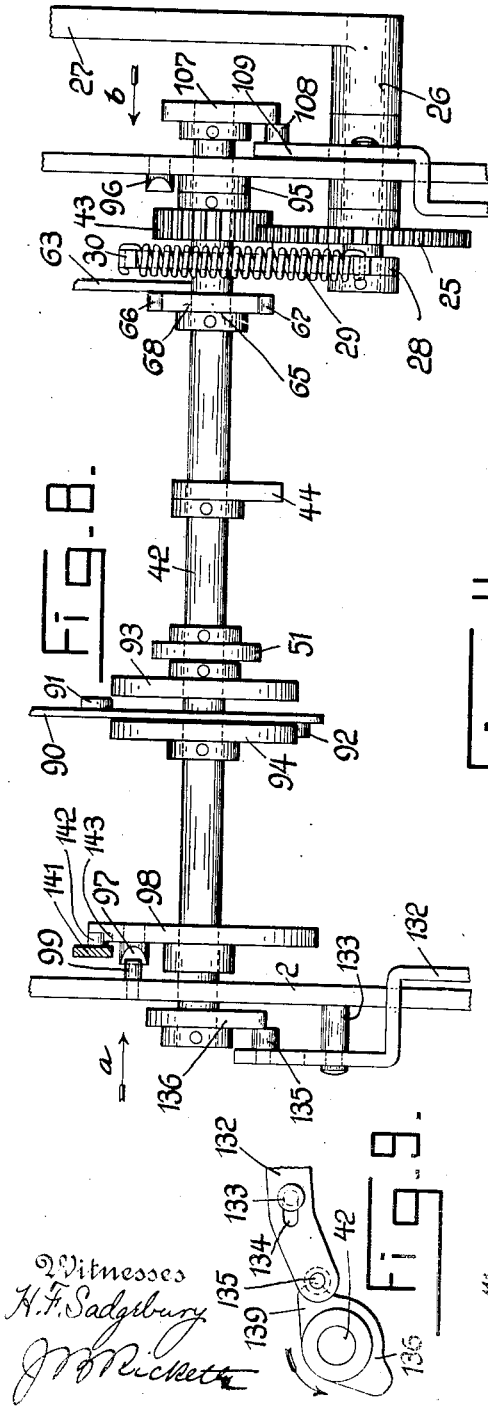
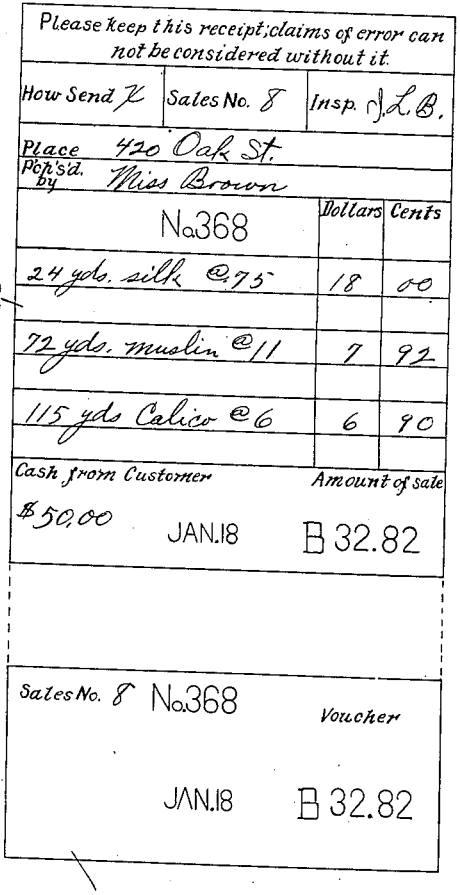
Witnesses
H. F. Sadgebury
J. W. Ricketts
Inventor
Thomas Carroll
by W. H. Murphy
and R. C. Glass
Attorneys

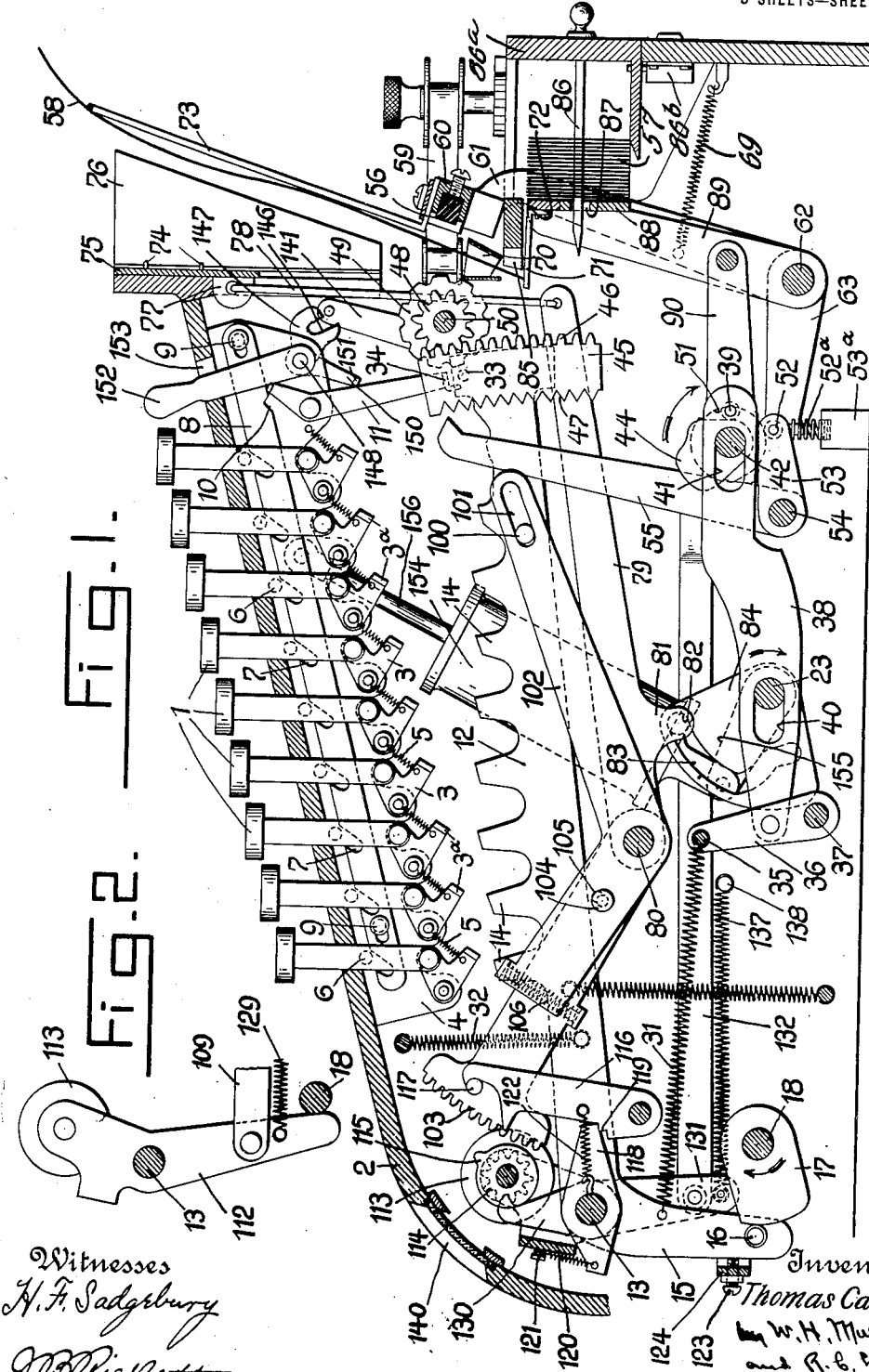

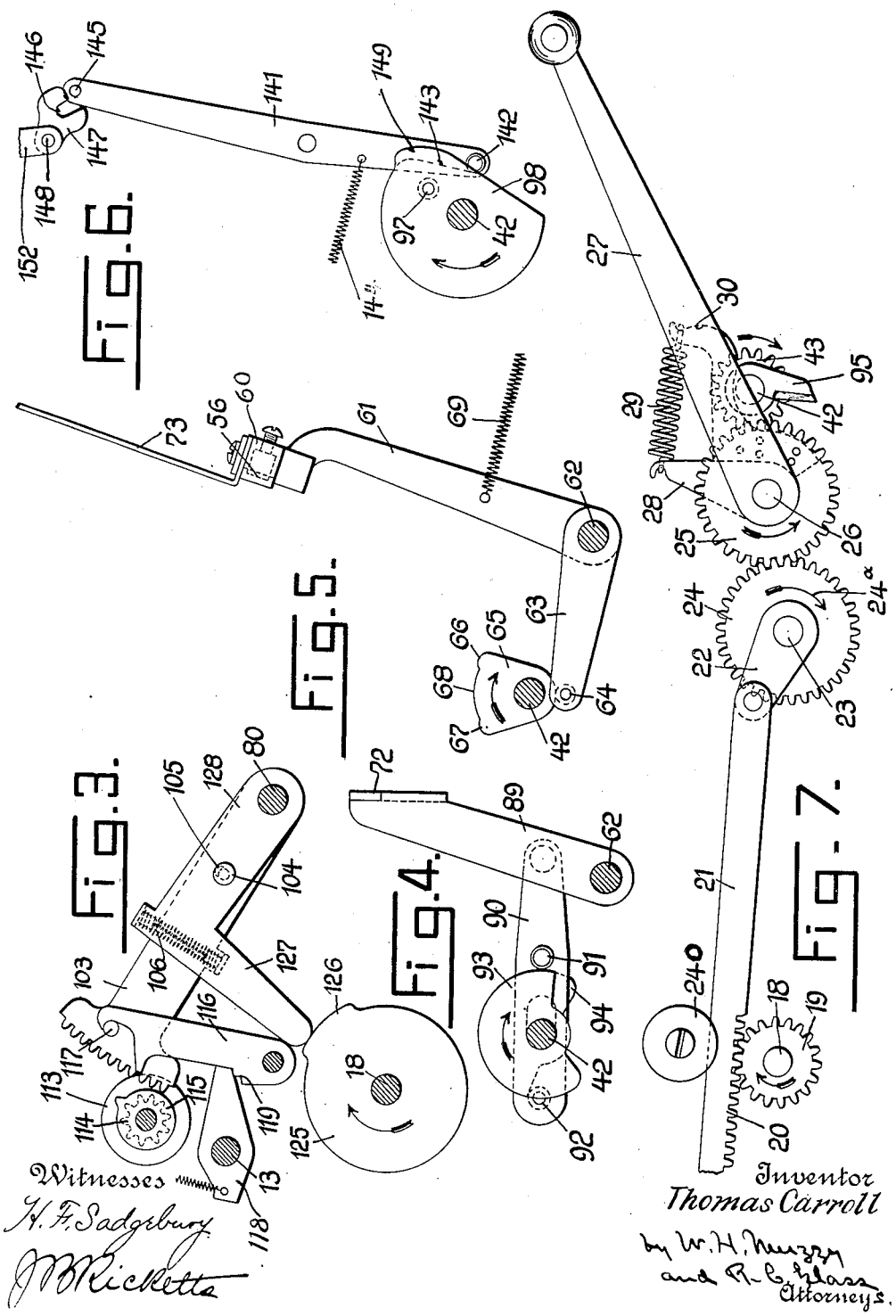

UNITED STATES PATENT OFFICE.

THOMAS CARROLL, OF OAKWOOD, OHIO, ASSIGNOR TO THE NATIONAL CASH REGISTER COMPANY, OF DAYTON, OHIO, A CORPORATION OF OHIO, (INCORPORATED IN 1906.)

SALES RECORDING AND TOTALIZING MECHANISM.

1,174,680. Specification of Letters Patent. Patented Mar. 7, 1916.

Application filed May 26, 1911. Serial No. 629,569.

*To all whom it may concern:*

Be it known that I, THOMAS CARROLL, a citizen of the United States, residing at Oakwood, in the county of Montgomery and State of Ohio, have invented certain new and useful Improvements in Sales Recording and Totalizing Mechanisms, of which I declare the following to be a full, clear, and exact description.

In most department stores and other large commercial establishments duplicate records of each purchase are manually made on sales slips, one of which slips is presented to the customer while the other is retained by the clerk and at the end of the day's business turned in to the auditing department. When these records are made manually there is an opportunity fraudulently to enter different amounts upon the original and the duplicate. That is, it is possible on the original, which is presented to the customer, to enter the correct amount of the purchase, while upon the duplicate, which is turned over to the auditing department, to enter a less amount, thereby enabling the clerk to keep the difference.

Another serious objection to the manually made records, is that they are hurriedly made and consequently the auditing force in checking them over find difficulty in deciphering the figures thereon, and frequently make wrong entries in their tabulations, which necessitates rechecking all of the sales slips for the day.

It is the principal object of this invention to provide an accounting machine for recording in duplicate upon a sales slip and to retain within the machine one of the duplicate records. By thus making the duplicate records, it is impossible for the clerk to alter said records and as these records are printed they may be easily read, thereby reducing to a minimum the danger of the auditing force wrongly reading the recorded amounts.

Another object of this invention is to provide an improved accumulator in which the amounts recorded are totalized.

With these and incidental objects in view the invention consists in certain novel features of construction and combinations of parts the essential elements of which are set forth in appended claims and a preferred form of embodiment of which is hereinafter shown with reference to the drawings which accompany and form part of this specification.

Figure 1 is a central transverse sectional view through the improved machine. Fig. 2 is a detail side elevation of the pivoted frame carrying the accumulator. Fig. 3 is a sectional view through the accumulator showing one of the higher denominational elements and the actuator therefor. Fig. 4 is a detail view of one of the knives and its operating mechanism for severing the sales slips. Fig. 5 is a detail view of the impression mechanism and the operating cam therefor. Fig. 6 is a detail view of the key releasing mechanism. Fig. 7 is a detail side elevation of the operating lever and the gearing connected thereto. Fig. 8 is a top plan view of the main operating shaft and the various cams mounted thereon. Fig. 9 is a detail side elevation looking in the direction of arrow *a* (Fig. 8), of the cam and link connection for operating the alining pawls and the accumulator. Fig. 10 is a detail side elevation looking in the direction of arrow *b* (Fig. 8), of the operating cam for rocking the accumulator into engagement with the actuators. Fig. 11 is a view of the sales slip used with the machine with the stub or voucher severed from the main portion of said sales slip.

Described in general terms the machine comprises a plurality of amount manipulative devices such as keys and a bank of clerks manipulative devices. These manipulative devices control differentially movable elements, which set up type carriers to have recorded therefrom the amounts represented by the depressed amount keys and also the initial of the clerk making the sale. Duplicate impressions are taken from the type carriers, and between the taking of the impressions a slide carrying the sales slip is lowered, and while the second impression is being taken or immediately thereafter, the portion of the sales slip containing the first impression is severed from the main part of the sales slip and filed in a suitable receptacle.

The differentially movable elements are connected to actuators of an accumulator, and these actuators are moved distances depending upon the throw of the differential elements. After the actuators have been differentially positioned, the elements of the accumulator are moved into engagement therewith and the actuators then restored to normal position, by which movement the amount set up on the type carriers will be registered in the accumulator.

In the machine there are provided four banks of manipulative amount devices 1, such as keys and a single bank of character keys for designating the different clerks operating the machine. These keys are identical and only a single bank has been shown, a description of which, it is thought, will suffice for all of said banks. These keys 1 are suitably guided in the frame 2 of the machine and at their lower ends are connected to bell crank levers 3 which are pivoted to extensions 4 of the frame work. Springs 5 are connected to one arm of each bell crank 3 and to the pivotal points of the next bell crank, which springs normally hold the keys 1 in their elevated position, as shown in Fig. 1. Projecting laterally from these keys are studs 6, which, when said keys are in their elevated position, contact with the under side of the frame 2 and thereby limit the upward movement of said keys. These pins, when the keys are depressed, engage with inclined slots 7 formed in a detent slide 8 which is slidably mounted upon the extensions 4 by pins 9. When one of the keys is depressed its pin 6 will engage its companion slot 7 and move the detent rearwardly. The under side of this detent is provided with a notch 10, into which the upper end of a pivoted latch 11 snaps when said detent is moved rearwardly upon the depressing of a key, and thus holds said detent in its rearward position, in which position the operated key will be held depressed, while the unoperated keys will be locked from operation by the upper edge of the detent passing below the pins 6 of the unoperated keys.

Differential elements 12, one only of which is shown, are loosely mounted upon a transverse shaft 13 located in the forward part of the machine. The bell cranks 3 connected to the keys 1 have offsets 3ª with which steps 14 formed upon the upper edge of each of the differential elements 12 contact, when said elements are released and rocked about the shaft 13 as hereinafter described. Each of the elements 12 has extending downwardly from its forward edge an arm 15, which at its lower end is equipped with a roller 16 that is normally held by suitable springs in engagement with the surface of a cam 17 secured to a rock shaft 18 suitably mounted in the frame work of the machine. This shaft 18 is provided at one end with a pinion 19 (Fig. 7) which meshes with rack teeth 20 formed upon the lower forward edge of a link 21, which link at its rearward end is connected to an arm 22 secured to one end of a rock shaft 23, that is also mounted in the frame work of the machine. The upper edge of the link 21 engages with a roller 240, suitably mounted upon the right hand side frame and by which the rack portion 20 of the link 21 is held in engagement with the pinion 19. The rock shaft 23 has secured thereto near its right hand end a gear 24, which meshes with a similar gear 25 loosely mounted upon a stub shaft 26, to the outer end of which is fastened an operating lever 27. Secured to this stub shaft 26 at its inner end is an arm 28, to which is connected one end of a stout spring 29, the other end of which is connected to an arm 30, which in turn is pinned to the gear 25. From this it will be seen that as the operating lever 27 is moved forwardly or in an anticlockwise direction, the spring 29 will pull upon the arm 30 and rotate the gear 25 in a similar direction and by the gear 25 meshing with the gear 24 rotate the shaft 23 in the direction of the arrow 24ª, and through the link connection 21 rotate pinion 19 and shaft 18 in a clockwise direction. The purpose of the spring connection between the operating lever and the gear 25 is to prevent the racking of the operating mechanism by a sudden operation of the operating lever 27.

When the shaft 18 is rotated, as above described, the cams 17, of which there is one for each differential element 12, will pass out of engagement with the rollers 16 projecting from the arms 15 of the differential elements 12 and the latter will be rocked in an anticlockwise direction upon the shaft 13 by springs 31 and 32. The differential elements 12 coöperating with the key banks in which keys have been depressed will be arrested by the steps 14 coming in contact with the offsets 3ª of the bell cranks 3 connected to the depressed keys. The differential elements which coöperate with the banks in which no keys have been depressed, will be arrested in their upward movement by pins 33, projecting from the extreme rear ends of said elements 12, coming into contact with offsets 34 projecting from the lower end of the latches 11, which coöperate with the banks of unoperated keys, it being understood that the latches 11 coöperating with the banks in which keys have been depressed will be rocked to latch the detents 8 in their operated position, by which rocking the offsets 34 of said latches will be carried out of the path of movement of the pins 33 projecting from the elements 12, which coöperate with the banks of operated keys.

Springs 32, of which there is one for each element 12, are normally under tension so that when the high portion of the cams 17 are moved from engagement with the rollers 16, these springs will rock the elements 12 as above described. The springs 31 are normally untensioned and are tensioned previous to the passing out of engagement of the high portions of the cams 17 with the rollers 16 so as to assist in the rocking of the differential elements by the following mechanism. The inner ends of these springs 31 are connected to a cross rod 35 which is supported by arms 36, which in turn are rigidly connected to a shaft 37 suitably mounted in the frame work of the machine. One of these arms 36 is connected to the forward end of a link 38, which link at its rearward end is provided with a roller 39. This link is provided with elongated slots 40 and 41, through which respectively extend the shaft 23 and a shaft 42, the latter being the main operating shaft of the machine. This shaft 42 has secured to its right hand end a pinion 43 which meshes with the gear 25 and as the handle 27 is pulled forwardly the pinion 43 and shaft 42 will be rotated in the direction of the arrow (Figs. 1 and 7) by the gear 25. Secured to this shaft 42 within the machine is a cam 44 which coöperates with the roller 39 projecting from the rearward end of the link 38. The shape of this cam 44 is such that upon the beginning of the rotation of the shaft 42 it will cam the link 38 rearwardly by which movement the frame comprising the arms 36 and the rod 35 will be rocked in a clockwise direction thereby tensioning the springs 31, which tensioning occurs previous to the passing out of engagement of the high portion of the cams 17 with the rollers 16.

Each of the differential elements 12 is provided at its extreme rearward end with a plate 45, which plate at its rearward edge has a rack portion 46, while the forward edge thereof has V-shaped notches 47 cut therein. The rack portion 46 meshes with a pinion 48 secured to a type carrier 49 loosely mounted upon a transverse rod 50 suitably secured in the frame work of the machine. After the type carriers 49 have been adjusted a cam portion of a disk 51 fast on shaft 42 will engage with a roller 52 projecting from an arm 53 and rock said arm in a clockwise direction (Fig. 1). This arm 53 is secured to a shaft 54 and this shaft is provided with upwardly extending arms 55, one for each differential element 12 and as said shaft 54 is rocked by the cam disk 51, the upper ends of the arms 55 will engage with the V-shaped notches 47 formed upon the plates 45 and properly aline the type carriers 49. The roller 52 is normally held into engagement with the surface of the disk 51 by a coil spring 52$^a$ which is interposed between the arm 53 and a boss 53$^a$ projecting from the frame work of the machine.

Immediately after the type carriers 49 have been alined, a platen 56 will take an impression upon the vouched or stub portion 57 (Fig. 11) of a sales slip 58 from said type carriers 49, through a suitable inking ribbon 59, which passes between the sales slip and the type carrier. This platen 56 is carried by a frame composed of a cross rod 60 and side arms 61, the lower ends of said side arms 61 being secured to a shaft 62, to which shaft is also secured a forwardly extending arm 63 (Fig. 5) which arm at its forward end has projecting therefrom a roller 64, that coöperates with a cam 65 secured to the main operating shaft 42. This cam 65 is provided with two high portions 66 and 67, the first mentioned one of which will engage with roller 64 and force the platen 56 against the type carriers immediately after said type carriers have been alined by the pawls 55. After the first impression is taken from the type carriers by the platen 56 the cam 65 will be moved so as to present a reduced portion 68 to the roller 64, so that a spring 69 connected to one of the arms 61 will move the platen 56 away from the type carriers 49. While the roller 64 is riding upon the reduced portion 68 of the cam 65 the sales slip 58 will be lowered, as hereafter described, after which the raised portion 67 of the cam 65 will contact with the roller 64 and force the platen 56 against the type carriers 49 to take a second impression upon the sales slip proper.

As above stated, the sales slip is arranged to be fed between the taking of impressions thereon so that the duplicate impressions may be recorded upon a voucher portion of the sales slip and upon the sales slip proper. This feeding mechanism will now be described. The operator inserts the sales slip 58 between the type carrier 49 and the platen 56, the lower end of said sales slip passing through a suitable guide 70 and resting upon fingers 71 projecting forwardly from a movable knife blade 72. The upper end of the sales slip rests in an inclined position against a wire frame work 73 suitably secured to the upper edge of the cross rod 60 of the platen carrying frame, which wire frame is composed of several turns of wire. As the platen 56 is moved forwardly to take an impression from the type carrier 49, as previously described, the wire frame will also move forwardly and carry the upper portion of the sales slip therewith and just as the impression is taken upon the voucher portion 57 of the sales slip, the main portion of said slip will be impaled upon pins 74 projecting from a slip carrier in the form of a slide 75, which is guided by plates 76 that project rearwardly from the frame work and overlap the ends of said slide 75. This slide has projecting forwardly therefrom a lug 77 to which is connected the upper end of a rod 78, the lower end of which is connected to an arm 79, which in turn is loosely mounted upon a transverse rod 80 suitably supported in the frame work of the machine. This arm 79 has an extension 81 from which projects a stud 82 that plays in a cam groove 83 formed in a plate 84 secured to the rock shaft 23. The shape of the cam groove 83 is such that immediately after the withdrawal of the platen 56 from the type carriers 49 after taking the first impression, the paper carrier or slide 75 will be lowered, it being remembered that the sales slip has been impaled upon the pins 74 of the slide 75 as an incident to the taking of the first impression from the type carriers. After the slide 75 carrying the sales slip has been lowered the platen will again be forced against the type carriers by the high portion 67 of the cam 65 (Fig. 5) to take the second impression from said type carriers. Previous to the lowering of the slide 75 carrying the sales slip the movable knife 72 and the fingers 71 carried thereby will be moved forward of the lower end of the sales slip 58 so as not to obstruct the lowering of said slip by the slide 75. After the sales slip has been lowered the knife 72 is moved rearwardly, by which movement the lower or voucher portion 57 of the sales slip will be severed by the movable knife 72 engaging with a stationary knife 85. Simultaneously with the severing of the voucher portion of the sales slip the said voucher will be impaled upon a filing pin 86, which pin passes through an opening 87 formed in a plate 88 forming the portion of the frame carrying the movable knife 72. The filing pin 86 projects forwardly from an L-shaped plate 86ª, the vertical wall of which is held flush with the back frame of the machine by the bolt of a lock 86ᵇ secured to said back frame. By unlocking the lock 86ᵇ, the plate 86ª carrying the pin file 86 may be withdrawn so as to render accessible the vouchers 57 on said pin file. The plate 88 connects side arms 89 which are loosely mounted upon the shaft 62 and to one of these side arms 89 is connected the rear end of a link 90 (Figs. 4 and 8) which link is provided upon opposite sides with rollers 91 and 92, the former roller coöperating with a cam 93 and the latter coöperating with a cam 94, which cams are secured to the main operating shaft 42. As the shaft 42 is rotated in the direction of the arrow (Figs. 4 and 7) upon the forward movement of the operating handle 27 the cam 94 will engage with the roller 92 and move the link forwardly and thereby rock the frame carrying the movable knife 72 forwardly so that said knife passes forward of the lower end of the sales slip 58. At the end of the forward movement of the crank handle 27, the shaft 42 will be shifted laterally, as hereinafter described, so as to bring the cam 93 into coöperative relation with the roller 91.

Now upon the return movement of the shaft 42 the cam 93 will engage with the roller 91 and move the link 90 and the frame carrying the movable knife 72 rearwardly, so as to sever the voucher portion of the slip 70 which, as previously described, has been lowered. At the end of the return movement of the shaft 42 the said shaft will be shifted laterally back to its normal position. This shifting of the shaft is brought about in the following manner. As the operating handle 27 nears the end of its forward movement an arm 95 projecting from the shaft 42 (Fig. 7) will engage with a beveled stud 96 (Fig. 8) projecting from the right hand side frame of the machine and as the operating handle continues its forward movement the arm 95 and shaft 42 will be shifted laterally to the left. Upon the return movement of the shaft 42 a beveled stud 97 (Figs. 6 and 8) projecting from a disk 98 secured to said shaft will contact with a stud 99 projecting from the left hand side frame of the machine and cam the disk 98 and the shaft 42 back to their normal position. The pinion 43 which meshes with the gear 25 and is secured to the shaft 42 is double the width of the gear 25 (Fig. 8) so that although the shaft 42 is shifted laterally, the pinion 43 will remain in mesh with the gear 25.

The mechanism which accumulates the total of the various amounts recorded upon the sales slip and the actuators therefor will now be described. The actuators are connected to the differential elements 12 and are moved distances corresponding to the extent of movement of said elements, after which the accumulator elements are engaged with the actuators, and upon the return of said actuators the amount set upon the type carriers by the differential elements will be registered upon the accumulator. The transfer mechanism for effecting the carrying from one denomination to another is of that well known type in which the actuators are moved an additional step. Projecting from each one of the differential elements 12 that coöperates with the amount banks of keys is a pin or stud 100 which plays in an elongated slot 101 (Fig. 1) formed in the rearward end of a lever 102 which is pivoted loosely upon the transverse rod 80. Mounted upon the rod 80 adjacent to each one of the levers 102 is an actuator 103 which has projecting therefrom a headed pin 104 that extends through an elongated slot 105 formed in the forward extension of the companion lever 102 which slot and pin connection is for the purpose of permitting movement of the actuator 103 independent of the lever 102 so as to effect a transfer, as is well known in the art. This independent movement of the actuator is brought about by a spring 106 the ends of which are fastened to offsets of the lever 102 and the actuator 103. As the differentially movable elements 12 are moved in an anticlockwise direction about their supporting shaft 13, the levers 102 through the pin and slot connection 100 and 101 will move the actuators 103 in a similar direction. As previously described, the shaft 42 will be shifted laterally at the end of the forward movement of the operating handle. Secured to the right hand end of this shaft is a cam 107, which as said shaft is shifted laterally is brought into coöperative relation with a roller 108 projecting from the rear end of a link 109 (Figs. 8 and 10). Upon the beginning of the return movement of the operating handle the cam 107 secured to the shaft 42 will engage with the roller 108 and move the link 109 forwardly. This link 109 is guided near its rearward end by a pin 110, which extends through a slot 111 formed in the link 109 and into the right hand side frame of the machine. At its forward end this link is connected to a depending arm of a frame 112 (Fig. 2), which frame carries the accumulator elements 113.

The accumulator frame 112 is loosely mounted upon the shaft 13, upon which is also mounted the previously described differential elements 12. Secured to each of the accumulator elements 113 is a pinion 114 (Figs. 1 and 3) and a one-toothed transfer disk 115. As the link 109 is moved forwardly it will be seen that the accumulator frame 112 will be rocked in a clockwise direction (Fig. 2) and thereby carry the pinions 114 of the accumulator elements 113 into engagement with the actuators 103, after which the displaced actuators will be returned to their normal position by the cams 17 (Fig. 1), which cams engage with the rollers 16 projecting from the downwardly extending arms 15 of the differentially movable elements 12. As these elements 12 are returned the pins 100 projecting therefrom will also return the levers 102, which movement is conveyed to the actuators 103 by the springs 106 connecting the actuators and the levers 102.

The actuators 103 are arrested at the end of their return movements by trip pawls 116 which obstruct pins 117 projecting from the actuators 103, the differential elements 12 being given an additional increment of movement, which is permitted by the pin and slot connections 104 and 105. This additional return movement of the elements 12 tensions the springs 106 so that if any of the pawls 116 is tripped by a subsequent operation of the machine the spring will advance the actuator one step to effect the transfer, as is well known in the art. Coöperating with each of these trip pawls 116 is the one-toothed disk 115 secured to each of the accumulator elements, which as said element makes a complete rotation will rock the pawl 116 in a clockwise direction so as to permit the passage of the pin 117 projecting from the companion actuator 103.

Retaining pawls 118 engage with shoulders 119 formed upon the trip pawls 116 as said pawls are tripped, and thereby hold the pawls in their tripped position. It will be noticed that the retaining pawls 118 are mounted upon the same shaft 13 about which the accumulator frame 112 is rocked. The cross rod of this frame bears upon the upper edge of the retaining pawls 118 when the accumulator elements are out of engagement with the actuators 103, so as to hold the retaining pawls above the shoulders 119 of the trip pawls. As the accumulator frame is rocked to carry the pinions 114 into engagement with the actuators 103, the cross bar of the accumulator frame will rise above the upper edge of the retaining pawls 118 so that if any of the trip pawls are actuated during the rotation of the accumulator elements, the said trip pawls will be permitted to move into engagement with the shoulders 119 by springs 120 which connect the forward edge of the retaining pawls with pins 121 projecting from the cross bar of the accumulator frame 112. The trip pawls 116 are normally held in engagement with the pins 117 of the actuators by springs 122, the ends of which are secured to said trip pawls and the shaft 13.

The return movement of the elements 12 is limited by set screws 123 which contact with the forward edge of the downward extensions 15 of said element. These set screws extend through a cross bar 124 which is suitably supported by the side frames of the machine.

It is frequently desirable to provide more accumulator elements than there are banks of keys in order to provide an extended total after the registering capacity of the keyboard has been reached, and as only the same number of differential elements 12 are employed as there are banks of keys it becomes necessary to provide additional actuators 103 of higher denominations with means for giving them a transfer effecting movement. This means is shown in Fig. 3. Secured to the shaft 18 located in the forward part of the machine are disks 125, one for each of the actuators that is employed above the key registering capacity. These disks 125 are provided with camming projections 126 which coöperate with downward extensions 127 of arms 128 which are mounted upon the cross rod 80. These arms 128 take the place of levers 102 and are connected to the actuators 103 by springs similar to the springs 106 and through similar pin and slot connections 104 and 105 respectively. It will be noticed from this figure that the arms 128 are normally elevated by the cam portions 126 of the disks 125. Upon the beginning of the operation of the machine these cam portions pass out of engagement with the extensions 127 so as to permit the contraction of the springs 106. At the end of the operation of the machine, the cam portions 126 will be returned to the position shown in Fig. 3 in which position they will rock the arms 128 against the tension of the springs 106 so that if the pawls 116 are tripped, the actuators will be moved an additional step by the springs 106 to effect a transfer.

At the end of the return movement of the operating handle 27, the main operating shaft 42 will be shifted back to its normal position, as shown in Fig. 8, at which time the cam 107 will pass out of engagement with roller 108 of the link 109 so that said link will be free to return to its normal position. This return movement of the lever 109 is accomplished by a spring 129 (Fig. 2), one end of which is connected to the downward extension of the accumulator frame 112 and the other end secured in a suitable manner to the frame work of the machine. From this it will be seen that as the cam 107 passes out of engagement with the roller 108, the accumulator frame will be rocked in an anticlockwise direction by the spring 129 thereby moving the pinions 114 of the accumulator elements 113 out of engagement with the actuators 103. As this accumulator frame is returned to normal position, the cross bar of said frame will contact with the upper edge of any of the displaced retaining pawls 118 and recock the same.

Pawls 130 (Fig. 1) are rigidly secured to the shaft 13 and these pawls engage with the pinions 114 of said accumulator elements when the accumulator elements are disengaged from the actuators so as to prevent accidental movement of the accumulator elements while so disengaged. Near the left hand end of the shaft 13 is secured a downwardly extending arm 131 to which is connected the forward end of a link 132, the rearward end of which is guided by a pin 133 (Fig. 9) which protrudes through an elongated slot 134 in said link into the left hand side frame of the machine. This link at its rear end is provided with a roller 135, with which a cam 136 secured to the left hand end of the main operating shaft 42 is arranged to coöperate. This cam 136 is normally out of operative relation with the roller 135 but as said shaft 42 is shifted laterally at the end of the forward movement of the operating handle, this cam 136 moves into coöperative relation with said roller. Upon the beginning or return movement of the shaft 42, the cam 136 will move the link 132 forwardly at which time the cam 107 is also moving the link 109 forwardly so that the pawls 130 will remain in engagement with the pinions 114 as said pinions are moved into engagement with the actuators 103. Immediately after the pinions 114 of the accumulator elements 113 engage with the actuators a reduced portion of the cam 136 will present itself to the roller 135 and the shaft 13 carrying the pawls 130 will be rocked so as to carry the pawls out of engagement with the pinions 114. This rocking of the shaft 13 is caused by a spring 137, the ends of which are connected to the lower end of the arm 131 and to a pin 138 projecting from the left hand side frame (Fig. 1). At the end of the return movement of the rock shaft 42 an additional raised portion 139 of the cam 136 will engage with the roller 135 and move the link 132 forwardly so as to rock the shaft 13 and thereby the pawls 130 into engagement with the pinions 114, this movement occurring after the actuators have come to rest and previous to the disengagement of the pinions 114 from the actuators. At the extreme end of the return movement of the shaft 42 said shaft will be shifted laterally back to its normal position, during which movement of the shaft the raised position 139 will pass out of engagement with the roller 135, which is also true of the cam 107 relative to the roller 108, so that the accumulator frame 112 and the rock shaft 13 are free to be returned to their normal positions by springs 129 and 137 respectively. The movement of the accumulator frame 112 is limited by the downward extension of said frame coming into contact with the shaft 18 (Fig. 2), while the movement of the pawls is limited by the end of the slot 134 of the link 132 contacting with the pin 133 (Fig. 9).

A suitable opening 140 is formed in the casing 2 which opening is covered by suitable transparent material so as to enable the reading of the amount shown by the accumulator elements 113.

The previously described cam disk 98 secured to the rock shaft 42 is utilized for the purpose of releasing the depressed keys. This is brought about in the following manner. Projecting from the lower end of a centrally pivoted lever 141 (Fig. 6) is a roller 142 which coöperates with the cam disk 98. This roller 142 normally engages with a camming portion 143 of the disk 98 and as said disk is rotated in the direction of the arrow shown in said figure, the lever 141 will be rocked in an anticlockwise direction against the tension of its spring 144. The upper end of this lever is provided with a pin 145, which is arranged to engage with the walls of the slot 146 formed in an arm 147, which is secured to a rock shaft 148 suitably mounted in the projections 4 of the casing 2 (Fig. 1). This rocking of the lever 141 by the cam portion 143 is not sufficient to operate the arm 147 but is used for the purpose of bringing the roller 142 upon the surface of the disk 98. At the end of the movement of the shaft in the direction of the arrow, the said shaft will be shifted laterally, as previously explained, so that upon the return of the shaft a cam portion 149 of the disk 98 will engage with the roller 142 and rock the lever 141 sufficiently so that the pin 145 will engage with the walls of the slot 146 and rock the arm 147 and shaft 148 in a clockwise direction. Secured to this shaft 148 are downwardly extending arms 150 (Fig. 1) which have offsets 151 that engage with the rearward edges of the downwardly extending portion of the latch levers 11. From this it will be seen that as the shaft 148 is rocked, as above described, the offsets 151 will also rock the latch levers 11 in a clockwise direction, so as to withdraw the upper ends of said levers out of the notches 10 of detents 8, which permit springs 5 of the depressed keys to return said keys to their normal positions. This movement of the keys will return the detents 8 to their normal positions. Secured to the right hand end of the shaft 148 is the lower end of a lever 152, the upper end of which protrudes through an opening 153 of the casing 2 (Fig. 1). This lever is used for the purpose of releasing wrongly depressed keys previous to the operation of the machine.

In order to prevent a too rapid movement of the operating mechanism by the operating lever 27 the lower end of a suitable dash pot 154 is connected to an arm 155 which is secured to the rock shaft 23 (Fig. 1), while the upper end of a piston rod 156 which plays in the dash pot 154 is suitably pivoted to the frame work of the machine. This form of retarding devices is well known in the art and needs no further description.

In a prior patent to the present applicant, No. 980,201, granted January 3rd, 1911, there is shown a machine of the general type of the application. In that machine the sales slip is placed on a pivoted table which is swung up to print. The table carries a feeding roller connected to the main operating mechanism of the machine whereby the slip may be fed into the machine and a second imprint taken thereon. That feeding construction has been found in practice to be highly efficient, but the feeding or slip carrying mechanism of the present application has the advantage of being simpler and less costly to construct, consisting as it does merely of a slide having direct connections to the main operating mechanism of the machine, and thus not requiring as expensive machine work as does the previous patented construction.

While the form of mechanism herein shown and described is admirably adapted to fulfil the objects primarily stated, it is to be understood that it is not intended to confine the invention to the one form of embodiment shown but that it is susceptible of embodiment in various forms all coming within the scope of the claims which follow.

What is claimed is:

1. In a machine of the class described, the combination with means for recording a transaction in duplicate upon a sales slip, of means for feeding the slip between the recording of the duplicate records, and means for securing the slip to the feeding means as an incident to the first recording of the transaction.

2. In a machine of the class described, the combination with means for recording a transaction in duplicate upon a sales slip, of a reciprocatory device for feeding the slip between the recording of the duplicate records, and means for securing the slip to the feeding device as an incident to the first recording of the transaction.

3. In a machine of the class described, the combination with a set of type carriers and operating means therefor, of means for taking duplicate impressions upon a sales slip from the type carriers, means for feeding the slip between the taking of the duplicate impressions, and means for securing the slip to the feeding means as an incident to the taking of the first impression.

4. In a machine of the class described, the combination with a set of type carriers and operating means therefor, of means for taking duplicate impressions upon a sales slip from the type carriers, a reciprocatory device for feeding the slip intermediate the taking of the duplicate impressions, and means carried by the impression means for securing the slip to the feeding device as an incident to the taking of the first impression.

5. In a machine of the class described, the combination with a set of type carriers and operating means therefor, of a platen for taking duplicate impressions upon a sales slip from the type carriers, a reciprocatory device having pins projecting therefrom for feeding the slip intermediate the taking of the duplicate impressions, and means carried by the platen for forcing the slip upon the pins of the reciprocatory device as an incident to the taking of the first impression.

6. In a machine of the class described, the combination with a set of type carriers and operating means therefor, of a platen for taking duplicate impressions upon a sales slip from the type carriers, a reciprocatory feeding device for the sales slip having pins projecting therefrom for holding the slip to the feeding device, and means for operating the feeding device intermediate the taking of the duplicate impressions.

7. In a machine of the class described, the combination with means for recording a transaction in duplicate upon a sales slip, of means for feeding the slip intermediate the recording of the duplicate records, means for securing the slip to the feeding means as an incident to the first recording of the transaction, and means for severing the slip between the duplicate records.

8. In a machine of the class described, the combination with a set of type carriers and operating means therefor, of a platen for taking duplicate impressions upon a sales slip from the type carriers, a reciprocatory device for feeding the slip intermediate the taking of the duplicate impressions, means carried by the platen for securing the slip to the feeding device as an incident to the taking of the first impression, and means for severing the slip between the duplicate impressions thereon.

9. In a machine of the class described, the combination with means for recording a transaction in duplicate upon a sales slip, of means for feeding the slip intermediate the recording of the duplicate records, means for severing the slip between the duplicate records, and an oscillatory shaft having a lateral movement at the end of its oscillation in each direction for operating the severing means.

10. In a machine of the class described, the combination with a set of type carriers and operating means therefor, of means for taking duplicate impressions upon a sales slip from the type carriers at a single operation of the machine, means for feeding the sales slip intermediate the taking of impressions, and an oscillatory shaft having a lateral movement at the end of its oscillation in each direction for operating the impression means.

11. In a machine of the class described, the combination with a set of type carriers and operating means therefor, of means for taking duplicate impressions upon a sales slip from the type carriers, means for severing the slip between the duplicate impressions, and an oscillatory shaft having a lateral movement at the end of its oscillation in each direction for operating the impression means and the severing means.

12. In a machine of the class described, the combination with a set of type carriers and operating mechanism therefor, of means for taking duplicate impressions upon a sales slip from the type carriers, means for feeding the sales slip intermediate the taking of impressions, means for severing the slip between the impressions, and an oscillatory shaft having a lateral movement at the end of its oscillation in each direction for operating the impression means and the severing means.

13. In an accounting machine, the combination with a differentially movable actuator, of a series of keys for controlling the movement of said actuator, a pivoted frame and an accumulator mounted therein, an oscillatory shaft having a lateral movement at the end of its oscillation in each direction, a cam carried by the shaft and movable in different planes during the oscillation of the shaft, and connections actuated by the cam while moving in one plane and not in the other for rocking the accumulator into engagement with the actuator.

14. In an accounting machine, the combination with a movable frame and an accumulator mounted therein, of differentially movable actuators for said accumulator, a rock shaft having a lateral movement at the end of its movement in both directions, and means controlled by the rock shaft while moving in one direction for moving the frame and thereby the accumulator into engagement with the actuator.

15. In an accounting machine, the combination with a movable frame and an accumulator mounted therein, of actuators for said accumulator, differentially movable elements for driving said actuators, manipulative devices controlling the movement of said elements, springs for moving the differentially movable elements until arrested by the manipulative devices, a rock shaft having a lateral movement at the end of its movement in both directions, means controlled by the rock shaft while moving in one direction for moving the frame and thereby the accumulator into engagement with the actuators, and means for positively returning the differentially movable elements and thereby the actuators to normal position after the accumulator and actuators are engaged.

16. In an accounting machine, the combination with an accumulator having differentially movable elements, of actuators for said elements normally disengaged therefrom, alining pawls for said elements normally in engagement therewith, a rock shaft having a lateral movement at the end of its rocking movement in both directions, means under the control of the rock shaft for moving the accumulator into engagement with the actuators and for moving the alining pawls with the accumulator, and means for withdrawing the pawls out of engagement with the accumulator elements previous to the movement of said elements by the actuators.

17. In an accounting machine, the combination with an accumulator having differentially movable elements, of actuators for said elements normally disengaged therefrom, alining pawls for said elements normally in engagement therewith, a rock shaft having a lateral movement at the end of its rocking movement in both directions, cams carried by the rock shaft for moving the alining pawls and the accumulator as a whole, thereby carrying the accumulator elements into engagement with the actuator, and spring controlled means for withdrawing the pawls out of engagement with the accumulator elements after the latter are in engagement with the actuators.

18. In an accounting machine, the combination with a differentially movable element, of a series of keys controlling the movement of said element, a detent for said keys, and a latch for said detent, the said latch normally being in the path of movement of the differentially movable element.

19. In an accounting machine, the combination with a differentially movable element, of a series of keys for determining the movement of said element, a detent for holding the depressed key in operated position and the undepressed keys in inoperated positions, and a pivoted latch for said detent, the said latch normally being in the path of movement of the differentially movable element.

20. In a machine of the class described, the combination with a knife blade, and a projection therefrom positioned to support a material to be severed by said blade, means for moving said blade and said projection, and a stationary abutment against which said material rests.

21. In a machine of the class described, the combination with means for recording a transaction in duplicate upon a sales slip, of means for carrying the slip between the recording of the duplicate records, and means for securing the slip to the carrying means as an incident to the first recording of the transaction.

22. In a machine of the class described, the combination with a set of type carriers, of means for taking duplicate impressions upon a sales slip from said type carriers, means for carrying the slip from one position to another so as to take the impressions in different places upon the sales slip, and means for securing the slip to the carrying means as an incident to the taking of the first impression.

23. In a machine of the class described, the combination with a set of type carriers, of means for taking duplicate impressions upon a sales slip from said type carriers, means for carrying the slip from one position to another so as to take the impressions in different places upon the sales slip, means for securing the slip to the carrying means as an incident to the taking of the first impression, and means for severing the slip between the impressions thereon.

24. In a machine of the class described, the combination with means for recording a transaction in duplicate upon a sales slip, of bodily movable means for feeding the slip between the recording of the duplicate records, and means for securing the slip to the feeding means as an incident to the first recording of the transaction.

25. In a machine of the class described, the combination with a set of type carriers, of means for taking duplicate impressions upon a sales slip from the type carriers, bodily movable means for feeding the slip between the taking of the duplicate impressions, and means for securing the slip to the feeding means as an incident to the taking of the first impression.

26. In a machine of the class described, the combination with a series of depressible keys, of means for latching said keys in depressed position, a rock shaft, and a cam carried by said shaft and so constructed as to operate the latching means in one direction of movement only of said cam.

27. In a machine of the class described, the combination with a series of depressible keys, of means for latching said keys in depressed position, a lever for releasing the keys by operating the latching means, a rock shaft, and a cam carried by said shaft and constantly in engagement with the lever and so constructed as to operate the lever to release the latching means in one direction of movement only of said cam.

28. In an accounting machine, the combination with a differentially movable element, of a series of bell crank levers for determining the extent of movement of said element, keys pivotally connected to said bell crank, a detent for said keys, and a latch for said detent said latch normally being in the path of movement of the differentially movable element.

29. In an accounting machine, the combination with a main operating device, of a differentially movable element, means disabled at each operation of the main operating device for holding said element in normal position, a series of bell crank levers for determining the extent of movement of said element when released, keys for controlling said bell cranks, a detent for the keys, and a latch for the detent adapted to prevent a movement of said element when none of the keys is depressed.

In testimony whereof I affix my signature in the presence of two witnesses.

THOMAS CARROLL.

Witnesses:
Roy C. Glasa,
Carl W. Beust.